United States Patent
Wegener et al.

(10) Patent No.: US 6,490,432 B1
(45) Date of Patent: Dec. 3, 2002

(54) DISTRIBUTED MEDIA ON-DEMAND INFORMATION SERVICE

(75) Inventors: Albert W. Wegener, Portola Valley, CA (US); Thomas M. Linden, Los Gatos, CA (US); John Schoellerman, San Francisco, CA (US); William J. Loewenthal, San Mateo, CA (US); Donald F. Bogue, San Mateo, CA (US)

(73) Assignee: Command Audio Corporation, Redwood City, CA (US)

( * ) Notice: Subject to any disclaimer, the term of this patent is extended or adjusted under 35 U.S.C. 154(b) by 0 days.

(21) Appl. No.: 09/668,045

(22) Filed: Sep. 21, 2000

(51) Int. Cl.[7] ................................................. H04H 1/00
(52) U.S. Cl. ...................... 455/3.05; 455/3.06; 455/3.04
(58) Field of Search ................................ 455/566, 3.01, 455/3.02, 3.03, 3.04, 3.05, 3.06, 418, 151.2, 517; 380/237

(56) References Cited

U.S. PATENT DOCUMENTS

| | | | | |
|---|---|---|---|---|
| 5,758,293 A | * | 5/1998 | Frasier | 455/556 |
| 5,761,485 A | * | 6/1998 | Munyan | 345/839 |
| 5,815,671 A | * | 9/1998 | Morrison | 709/247 |
| 5,872,712 A | * | 2/1999 | Brennenman et al. | 700/88 |
| 6,029,135 A | | 2/2000 | Krasle | 704/275 |
| 6,119,155 A | | 9/2000 | Rossmann et al. | 709/219 |
| 6,192,340 B1 | * | 2/2001 | Abecassis | 704/270 |

FOREIGN PATENT DOCUMENTS

| | | | | |
|---|---|---|---|---|
| EP | 0 999 690 A1 | 5/2000 | | H04M/15/00 |
| FR | 2 759 228 | 8/1998 | | H04L/17/16 |
| WO | WO 00/22794 | 4/2000 | | H04L/29/06 |
| WO | WO 00/50984 | 8/2000 | | G06F/3/16 |

OTHER PUBLICATIONS

Simon Mason & Louse Scarborough, "WorldDAB MA/072", World DAB forum archives, Sep. 1, 2000, (16 pp.).

English language Abstract for French Patent No. 2759228, 1 pg.

Bayer, S.: "Embedding Speech in Web Interfaces" Spoken Language, 1996. ICSLP 96. Proceedings., Fourth International Conference on Philadelphia, PA, USA Oct. 3–6, 1996, New York, NY, USA, IEEE, US, Oct. 3, 1996, pp. 1684–1687, XP010238015, ISBN: 0–7803–3555–4.

Kindermann, N.: "Ein neuer Dienst mit großen Chancen" Telcom Report, Siemens AG. Munchen, DE, vol. 19, No. 3, 1996, pp. 30–31, XP000598194, ISSN: 0344–4724.

European Search Report for Application No. 0130 8055.1 (Feb. 19, 2002).

* cited by examiner

*Primary Examiner*—Edward F. Urban
*Assistant Examiner*—Erika A. Gary
(74) *Attorney, Agent, or Firm*—Skjerven Morrill LLP; Christopher B. Allenby

(57) ABSTRACT

Audio and/or video content is remotely stored. A portion of the remotely stored content is transferred to and stored in a mobile on-demand audio and/or video content output device. In addition, a link is transferred to and stored in the mobile output device. The link is associated with the content portion stored in the output device and points to another portion of the remotely stored content that is related to the content portion locally stored on the mobile device. In response to a user command entered on the mobile device, the related portion of the remotely stored content is accessed using a two-way wireless communications system and is transferred from the database to the mobile device for output.

26 Claims, 3 Drawing Sheets

DISTRIBUTED MEDIA ON-DEMAND INFORMATION SERVICE

BACKGROUND

1. Field of Invention

The present invention is related to audio/video-on-demand systems, and more particularly to an audio/video-on-demand system in which a portion of content in a remote database is locally stored in an audio/video-on-demand receiver and additional content in the database that is related to the locally stored content portion is accessed by the receiver.

2. Related Art

Portable devices with the ability to play audio or video information ("content") that is locally stored in semiconductor memory are well known (e.g., MP3 audio players, portable computers, and personal digital assistants (PDAs)). Typically the content must be transferred to the device from a separate digital source before the content can be output to the device user. Such digital sources include local, portable sources (e.g., compact disc (CD), digital video disc (DVD), SmartCard®, etc.) or remote sources (e.g., personal computers (PCs) or a computer acting as a server). These content sources are connected to the device via either a wired communications system (e.g., plain old telephone system (POTS), digital subscriber line (DSL), optical cable connection to the Internet (network of interconnected networks having an origin in research by the United States Advanced Research Project Agency)) or via a wireless communications system (e.g., terrestrial/satellite broadcast systems, cellular communications systems, fixed wireless or satellite connections to the Internet). In either case, the user selects the audio or video content to be transferred to and locally stored in the device for later output (playback). Once transfer of audio or video content has been completed, however, the locally stored content typically cannot be modified or updated. Also, additional information that is related to the locally stored content cannot be accessed after the initial transfer.

TABLE 1 presents the characteristics of several popular content consumption devices.

Audio/video-on-demand systems broadcast content (e.g., information and entertainment programs such as news, music, financial information, traffic reports) to system users. The broadcast content is selectively received (captured) by and locally stored in mobile receivers (e.g., produced by Command Audio Corporation of Redwood City, California) for subsequent output (playback) to the human user. Information regarding audio/video-on-demand systems is found in U.S. Pat. Nos. 5,406,626, 5,524,051, 5,571,806, and 5,590,195, each incorporated herein by reference. Additional information is found in U.S. patent application Ser. No. 09/454,901, entitled "Wireless Software And Configuration Parameter Modification For Mobile Electronic Devices" by Edward J. Costello et al., which is incorporated herein by reference. Although such on-demand systems allow the user to select audio or video content in an on-demand fashion, the receivers in such systems have limited memory capacity. The content stored in the remote database is typically many times (tens, hundreds, or thousands of times) larger than the receiver's local memory storage capacity.

For certain kinds of time-sensitive audio or video information, it is desirable to receive updates to the locally stored content. Further, it is desirable to be able to access additional information that is related to the locally stored content. In addition, it is desirable to indicate to the user when related additional audio or video content is available during playback of locally stored content.

SUMMARY

Content is remotely stored in a database. A portion of the remotely stored content is transferred to and locally stored in a mobile electronic audio/video-on-demand device. In addition, a link is transferred to and locally stored in the on-demand device. The link is associated with the locally stored content and also points to a portion of the remotely stored content that is related to the locally stored content. In some instances multiple links are associated with the locally stored content, and each unique associated link points to a unique portion of the remotely stored content. Multiple links are used in some embodiments for targeting user demographics in, for example, advertising.

An indication (audible, visual) is provided to the on-demand device user that a link is stored. In response to the user's command (manual, verbal), the link is used to generate a request to access the related, remotely stored content. In alternate embodiments the request is automatically generated. The request is sent by the on-demand device via a two-way wireless communications system to a content access manager that is electrically coupled to the database.

TABLE 1

| Devices/Systems | Storage Capacity | Device Type | Content Control | Content Delivery Method |
|---|---|---|---|---|
| CD, DVD, MP3 players | ~1 GB | Dedicated device | Button-press or remote | Physical media or storage |
| VCR | ~100 GB | Dedicated device | Button-press or remote; can schedule recordings | Physical media |
| Personal video recorders | ~20 GB | TiVo (TM), Replay Networks (TM) | Button-press or remote; can schedule recordings | Recorded from broadcast or cable TV |
| Phone information systems | ~1 TB | TellMe (TM), BeVocal (TM), Quack (TM) | Spoken word queries or instructions | Via telephone (PSTN) or cell phone |
| Streaming audio | ~1 TB | RealNetworks (TM), broadcast.com, Internet radio | Browser clicks | Internet connection (ISP) |

The accessed remotely stored content is then transferred by the access manager via the two-way communications system to the on-demand device for output. In some embodiments the output is immediate. In other embodiments the output is delayed.

DETAILED DESCRIPTION

Figure 1:
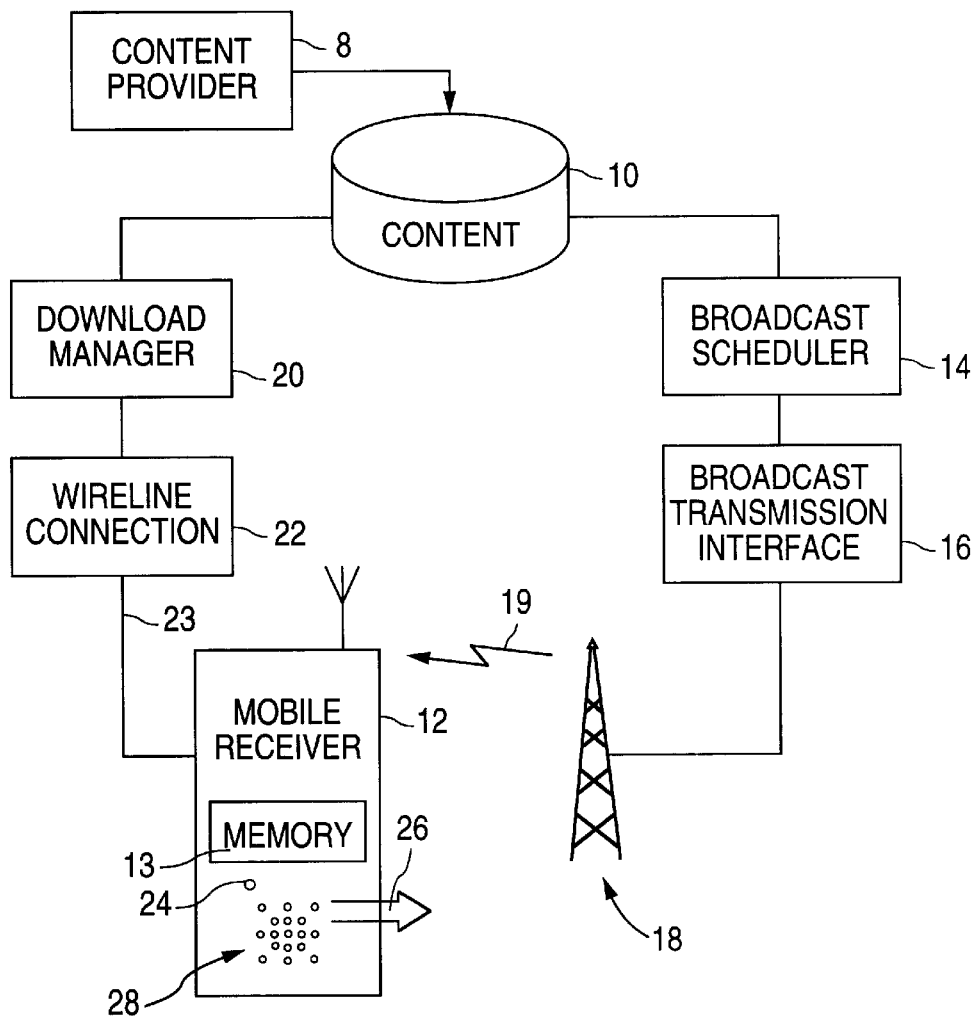
FIG. 1 is a diagrammatic view of an embodiment of the invention.

In contrast to the systems listed in TABLE 1, present embodiments require less memory (on the order of tens of MB) for local content storage. Some embodiments are integrated via software into other mobile devices, such as cellular telephones, personal digital assistants, and mobile computers. Thus embodiments do not require a dedicated, single-purpose device to present the services described herein. In accordance with embodiments of the invention, the user accesses remotely (apart from the local receiver) stored content by using button presses or voice commands in response to audible and/or visual cues present within, or output together with, the locally stored content. Thus the user accesses both locally stored content (that is, for example, downloaded and captured from a radio broadcast signal) and remotely stored content that is related to the locally stored content.

TABLE 2 illustrates several examples of how one kind of content (e.g., locally stored) may be related to another kind of content (e.g., remotely stored). The examples in TABLE 2 are illustrative of many possible relationships between locally and remotely stored content. In some instances the "Related Transactions" column entries refer to requests for additional advertising information. In other instances the "Related Transactions" column entries refer to initiating other actions such as "buy now" instant gratification acquisitions of products and/or services related to the locally stored content story or program.

TABLE 2

| Program Type | Example Story or Program | Additional Content | Related Content | Related Transaction |
| --- | --- | --- | --- | --- |
| News | Story about U.S. presidential election | Details on a recent straw poll | History of U.S. elections | Make a donation to a presidential candidate |
| Weather | Latest local weather forecast | 6-day local weather outlook | Weather in other cities | Purchase a weather radio |
| Sports | S.F. Giants win N.L. West | Barry Bonds is MVP | Atlanta Braves win N.L. East | Buy playoff tickets |
| Traffic | Local traffic report | Details on local bridge closure | Airport departure/arrival information | Get a coupon for free parking |
| Talk Radio | Story about divorce finances | Specific financial planning for divorcees | Financial planning for couples | Sign up for a local seminar to talk about money/divorce |
| Advertisement | Mercedes-Benz automobile advertisement | Details on S-class Mercedes | Comparable BMW cars | Receive a free S-class brochure |

TABLE 3 summarizes the present invention's primary characteristics, describing how audio/video content is distributed and managed between a mobile receiver and a remote database.

TABLE 3

| Parameter | Broadcast & Locally Stored Content | Remotely Stored Content for Point-to-point and/or Streamed/"live" Access |
| --- | --- | --- |
| What kind of content? | General interest subjects, headlines, "broad" subject areas | Detail or in-depth information, "niche" subject areas |
| Where is this kind of content stored? | Locally (in receiver memory after capture from broadcast signal) | Remotely (in an audio/video database) |
| How is this kind of content transferred? | Broadcast (one-way wireless) or via "always on" wired connection | Two-way wired or wireless |
| When is this kind of content transferred? | Prior to output to user | During output to user (live or "streamed") |

TABLE 3-continued

| Parameter | Broadcast & Locally Stored Content | Remotely Stored Content for Point-to-point and/or Streamed/"live" Access |
| --- | --- | --- |
| What is the access cost to this kind of content? | Low ("flat fee", "all you can use") | Higher ("pay per use", "pay per kB or MB") |
| How is this kind of content updated? | By capturing new broadcast (one-way wireless) signal or via "always on" wired connection | Whenever the audio/video database is updated by the content provider |

FIG. 1 is a diagrammatic view that illustrates functional blocks in an embodiment of the invention. Service provider 8 provides audio and/or video content to remote content database 10 that is stored in, for example semiconductor memory, rotating media, or other permanent form. Content is typically stored in database 10 by using compressed format to reduce the required storage capacity, and also to reduce the required bandwidth for transmitting or broadcasting the content to mobile audio/video-on-demand playback device 12 (e.g., manufactured by Command Audio Corporation, Redwood City, Calif.). Mobile device 12 includes memory 13 in which is stored a portion of content received from database 10. Content database 10 as shown in FIG. 1 is illustrative, and may be several remotely located data sources that store content for access.

In some embodiments, content is transferred for local storage in memory 13 via broadcast scheduler 14, conventional broadcast transmission interface 16 (e.g., commercial radio transmitter linked to telephone lines), and conventional transmission tower 18. Broadcast signal 19, sent from transmission tower 18, contains the content to be captured and locally stored in memory 13. Broadcast scheduler 14 determines the order in which scheduled broadcast content portions (e.g., programs) from content database 10 is transmitted. Broadcast scheduler 14 schedules content broadcast based on considerations such as content priority, preemption, and time-of-day restrictions that dynamically modify the content being transmitted.

In alternate embodiments, content is transferred for local storage in memory 13 via download manager 20, conventional wireline connection 22 (e.g., public switched telephone system (PSTN), Ethernet connection on a local area network, electrical connection to a personal computer), and wireline 23. Download manager 20 manages content delivery by actions such as verifying that mobile device 12 is authorized to receive specific content portions (e.g., programs) from database 10.

Once content has been transferred to and stored in memory 13, a portion of content remotely stored in database 10 locally resides in mobile device 12. Thus the locally stored content portion may be accessed by the audio/video-on-demand receiver in an on-demand fashion, as described more fully in U.S. Pat. Nos. 5,406,626, 5,524,051, and 5,590,195, referenced above. For content playback, the user activates input system 24 (comprising, e.g., a button) and a particular program 26 is output on conventional audio output speaker 28.

Figure 2:
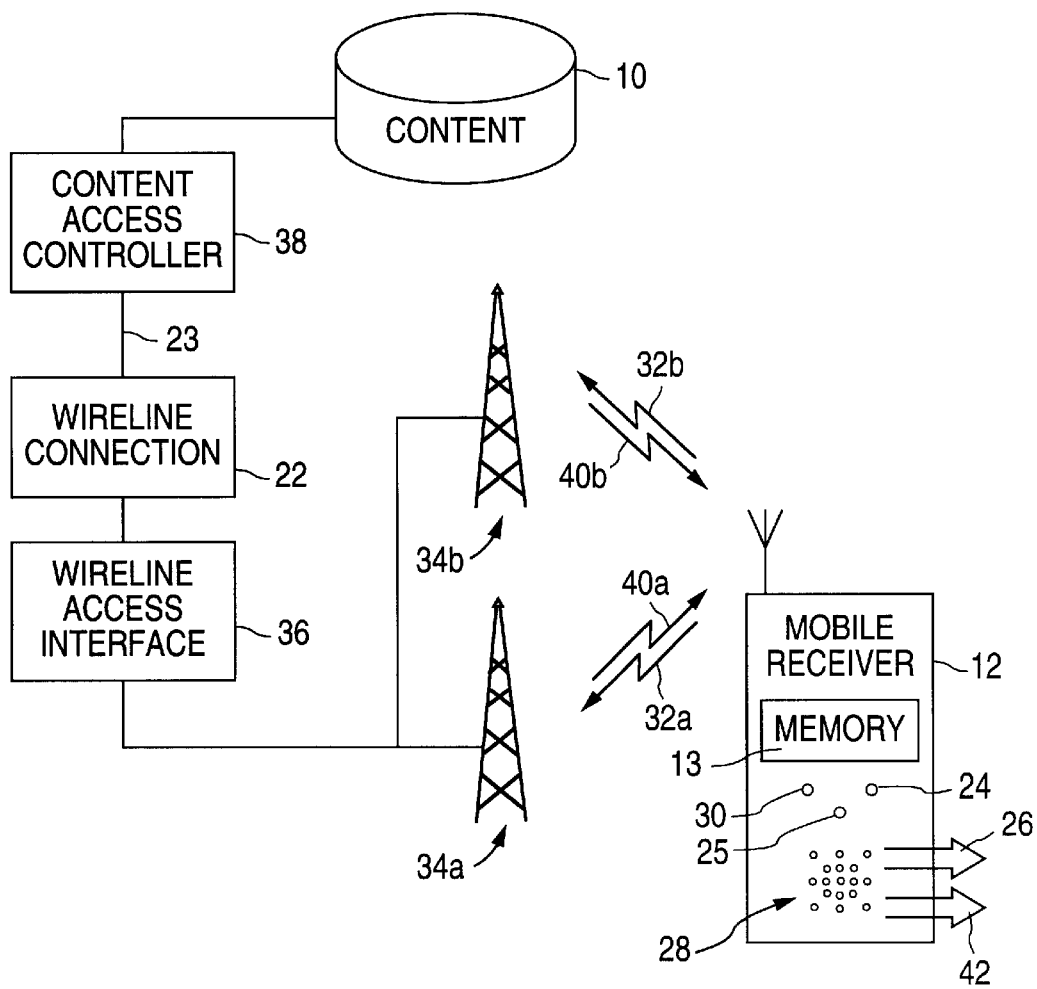
FIG. 2 is a diagrammatic view of another embodiment of the invention.

FIG. 2 is a second diagrammatic view that shows functional blocks in an embodiment of the invention. FIG. 2 is illustrative of a content playback mode embodiment and shows device 12 outputting program 26 from locally stored content in memory 13. In accordance with the invention, device 12 accesses additional or related remotely stored content, related to program 26, from database 10 during output of program 26. In some instances the additional or related information is accessed in response to a command from the user of device 12. In other instances, the additional or related information is accessed automatically by device 12.

As described below, locally stored content includes one or more links to additional or related remotely stored content. The presence of such a link is indicated to the user with, for example, a visual display 30 (e.g., flashing light-emitting diode, flashing liquid crystal display) or audio output (e.g., recognizable tone, synthesized voice). Upon perceiving the display that indicates the presence of a link, the user commands device 12 to access the linked information from database 10 by inputting a command on input system 24 (e.g., button press, verbal command using conventional speech recognition system 25) to device 12. Device 12 responds to the user command by initiating wireless connection 32a to two-way communications tower 34a. In some embodiments device 12 alternately conventionally initiates wireless connection 32b with two-way communications tower 34b if such connection provides a stronger signal than with tower 34a. Device 12 then sends a signal to be received by tower 34a,34b that requests additional or related content from database 10. The signal containing the request from two-way communications towers 34a or 34b is routed through conventional wireless access interface 36 (e.g., mobile telephone switching office (MTSO) in a cellular telephone system). Wireless access interface 36 routes the content access request through conventional wireline connection 22 to content access controller 38. Content access controller 38 ensures that the requests which arrive from wireline connection 22 are from authorized users. Also, content access controller 28 mediates the content requests for additional content from each mobile device 12 in a system of multiple mobile devices.

Once the requested content has been accessed from content database 10, content access controller 38 sends the accessed content back through wireline connection 22, wireless access interface 36, two-way communications towers 34a or 34b, and to mobile 12 via wireless connection 40a or 40b. Device 12 captures the accessed content from signals 40a,40b and outputs the accessed content as output 42. In some instances the accessed content is not stored in device 12 after output. In other instances the accessed content is stored in memory 13 and becomes part of the locally stored content. In some instances, the accessed content may include links to other remotely stored content in database 10, thereby allowing access to still more content for output to the user.

Figures 3A, 3B:
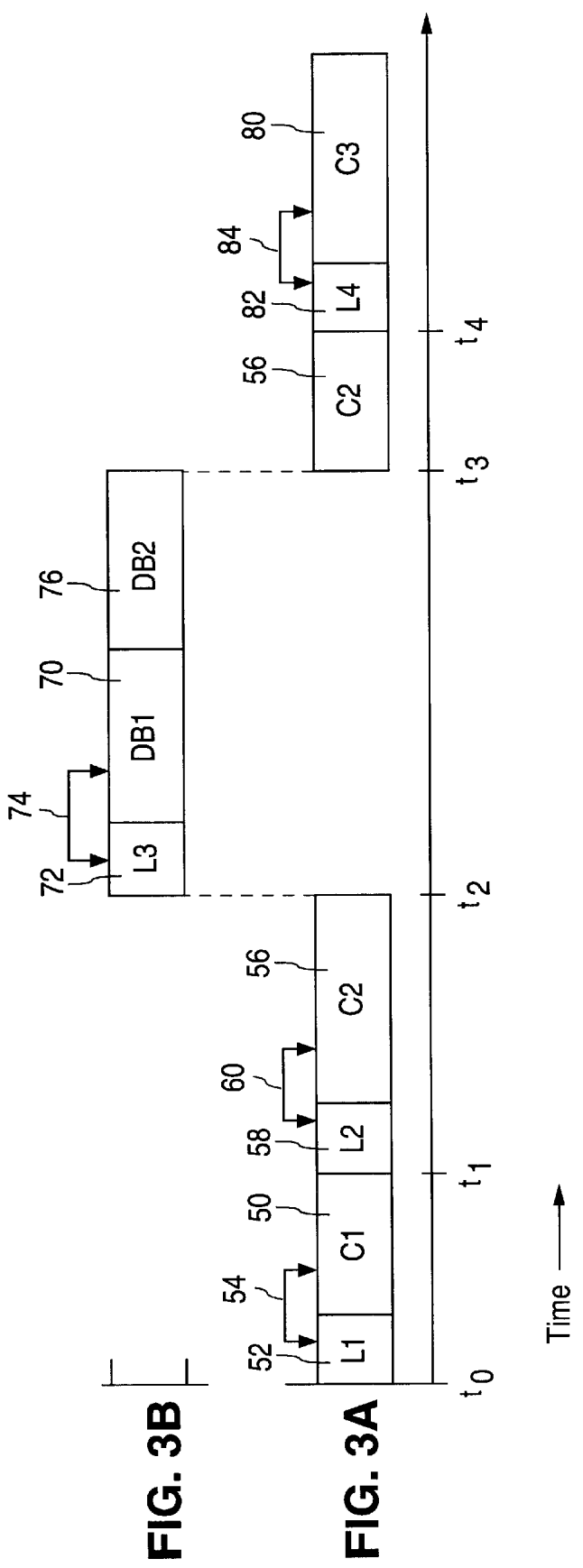
FIGS. 3A and 3B illustrate output of locally and remotely stored content.

FIGS. 3A and 3B illustrate a time sequence of content output to the user. FIG. 3A illustrates content from memory 13 that is output to the user, and FIG. 3B illustrates content from database 10 that is output to the user. Referring to FIG. 3A, is at time to the user of mobile device 12 initiates playback of content stored in memory 13 and content program 50 (C1) begins playback. Link 52 (L1) is associated (illustrated by arrow 54) with content program 50 and points to information in database 10 that is in addition to or is related to program 50. Link 52 contains enough information to conventionally access a specific portion of additional or related content in content database 10. Device 12 detects the presence of link 52 during output of program 50 and accordingly indicates to the user that such a link is available. In this illustrative description, the user chooses not to access remote content by using link 52.

After output of content program 50, device 12 begins to output at time $t_1$ a second content program 56 (C2). Link 58 is associated with program 56, as illustrated by arrow 60. Link 58 points to information in database 10 that is in addition to or related to program 56, and device 12 indicates to the user that link 58 is present. During output of program 56, at time $t_2$, the user perceives the indication on device 12 that a link exists, and subsequently commands device 12 to access the content indicated by link 58. Device 12 then accesses the database 10 content pointed to by link 58 by using the wireless link described above.

Referring to FIG. 3B, database content portion 70 (DB1) from database 10 is accessed by access controller 38 (FIG. 2) and begins to be output by device 12 to the user (access and transmission delay time is omitted for clarity). Link 72 (L3) is associated with database portion 70, as illustrated by arrow 74. In this example, link 58 also accessed a second database content portion 76 (DB2) which is output to the user immediately subsequent to output of content portion 70.

Referring again to FIG. 3A, at time $t_3$ locally stored content from memory 13 is once again output to the user as soon as output of content from database 10 (e.g., content portion 76) is finished. In this example, since output of program 56 was interrupted at time $t_2$, the remaining portion of program 56 (C2) is output to the user. After output of program 56 is complete, device 12 outputs program 80 (C3) from memory 13. Link 82 (L4) to content in database 10 is associated (arrow 84) with program 80, and operates in the manner of links 52, 58.

Figure 4:
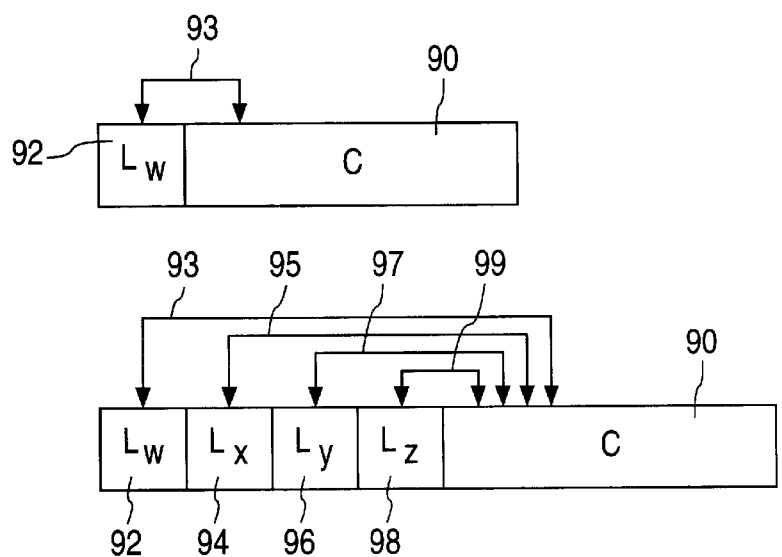
FIG. 4 illustrates single and single and multiple links associated with locally stored content

As illustrated in FIG. 4, a particular locally stored content program may have one or more links to remotely stored content in database 10. Thus in some embodiments, for program 90 (C) one link 92 ($L_w$) is associated (arrow 93) with program 90. In another illustrative embodiment, four links 92 ($L_w$), 94 ($L_x$), 96 ($L_y$), and 98 ($L_z$) are associated (arrows 93, 95, 97, 99, respectively) with program 90. For instance, link 92 may refer to additional content, 94 to related content, 96 to a purchase transaction, and 98 to an advertisement. In the case of multiple links, the presence of each link is displayed on device 12 to the user who then decides which (if any) link(s) to select. When the user selects multiple links, in some instances the remote content is accessed sequentially while in other instances device 12 returns to outputting the locally stored content before accessing remote content with a second link.

Some embodiments allow the user to browse the accessed remotely stored content and also the locally stored content. For example, the user may begin receiving program 70 output, decide that they are not interested, and either skip to program 76 output, to program 56 output, or to program 80 output. To facilitate browsing, the access to remote information is made within approximately one minute so that the output of locally stored and remotely accessed content is relatively seamless. In some instances the quick access is done by the associated link pointing to a specific location in remote database 10.

TABLE 4 describes at least three different types of links.

TABLE 4

| Link Type | Link Description |
| --- | --- |
| User-Requested | Link followed only by specific user command |
| Automatic | Link followed automatically without specific user command |
| Targeted | One of several links made available based on user demographic. |

User-requested links are only followed if the user of device 12 indicates (through button press, voice command, or other action) an interest in following the link. In contrast, device 12 always follows automatic links. Thus remote content is automatically accessed at some time during playback of the associated locally stored content. Thus automatic links require no indication of user interest, and the accessed remote content is automatically retrieved and output on device 12.

Targeted links take advantage of a user demographic profile (such as gender (Male, Female), age (e.g., "over age 25"), or other information (e.g., "dog owner")) to automatically select one of several links that may be followed. Thus if a man is receiving the locally stored content output, the "Male" link is made available. Similarly, if a dog owner is receiving the locally stored content output (each device 12 has a unique identifier, and so demographic profiling of each device 12 user is possible), then the link targeted for dog owners is made available. As another example of the use of targeted links, gender-targeted advertising links are inserted into a news program. Hence women accessing the available link will access one portion of content database 10 (e.g., advertising or merchandise targeted to women), and men accessing the available link will access another portion of content database 10 (e.g., advertising or merchandise targeted to men). Advertisers typically pay more for such targeted advertising capability, since their return on investment is improved if advertisements are targeted to well-defined groups.

TABLE 5 illustrates the parameters of a link that a user might select.

TABLE 5

| User-Selected Action | When will Accessed Content be Output (Consumed)? | In What Form is the Accessed Content? | To Where is the Accessed Content to be Delivered? |
| --- | --- | --- | --- |
| Play | Now | Audio, Video, Image, Text | On-demand Device |
| Download | Later | | On-demand Device, |
| Forward | Later | | Home Computer, Office Computer |

In some embodiments, when a user selects a link, there are several choices regarding delivery and output options. In one instance the accessed content is played immediately using two-way wireless connection signal 32a,40a. Alternately, the related content is downloaded later, for example via wired connection 23 or via broadcast signal 19. In other instances, the accessed remote content is forwarded to another device, such as a personal computer at home or at work. These link options provide the user a high degree of flexibility in determining when and where the accessed remote content will be output (consumed). In addition, allowing users the flexibility to defer content playback in some situations provides cost savings because the connection cost of two-way wireless connection 32a,40a may be much higher than the alternatives of downloaded by wireless content or captured from broadcast content.

The "In What Form is the Accessed Content?" column of TABLE 5 indicates that a link may offer a choice of presentation media (audio, video, image, text, etc.). Some media may be inappropriate for output at certain times. For instance, viewing a video feed on mobile device 12 while its user is simultaneously driving an automobile may be inappropriate and even dangerous. Alternately, text may be a preferred media for browsing information that was downloaded to a personal computer at home or at work in response to a user request for related material in a specific format.

In some embodiments the link offers the user of mobile device 12 a selection of delivery locations (e.g., mobile device 12, another device such as a specific personal computer at home or at work). In addition, links may be generalized to applications that co-reside with the media content and that are typically triggered by user interaction during playback. In the examples above, links are simple applications that direct the mobile device to perform tasks such as "forward additional content to my desktop", "buy a product/service now", or "play related information".

Figure 5:
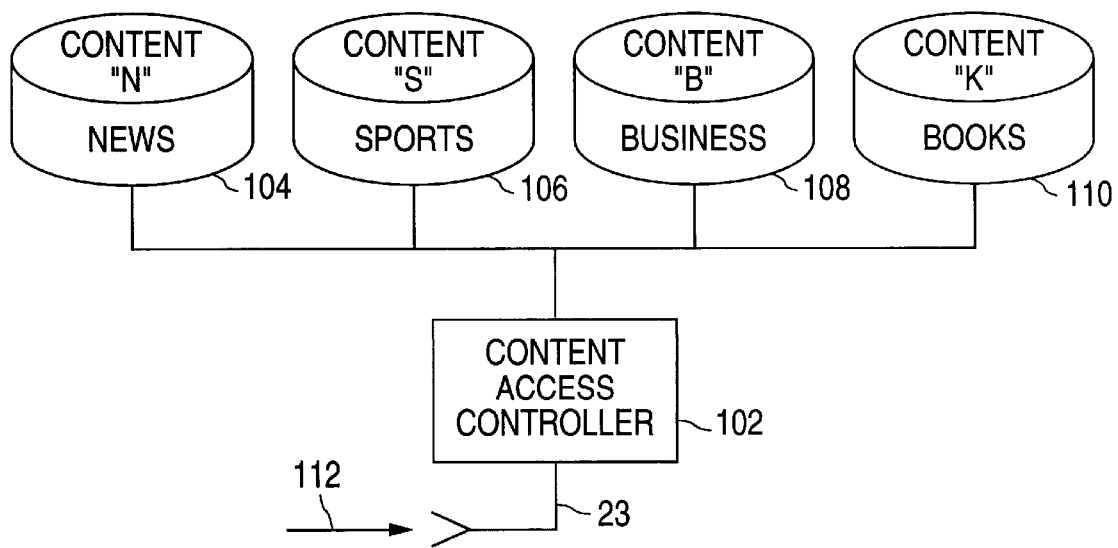
FIG. 5 is a diagrammatic view of multiple content databases.

FIG. 5 illustrates that in some embodiments content database 10 is created from multiple (two or more) separate databases linked by a common content access controller 102. As shown, news content database 104, sports content database 106, business content database 108, and popular books content database 110 are electronically coupled to access controller 102. These content databases 104,106,108, 110 may be physically resident in the same location, or may be physically separated in multiple locations. When link request 112 is sent to content access controller 102, link 112 may simply specify which content (e.g., story or program, such as "the 5 p.m. ABC news program, story 3.") is to be accessed. In such an instance, the link may not indicate in which content database (of multiple content databases 104, 106,108,110) that specific remote content resides. Therefore access controller 102 receives link request 112, analyzes request 112 to determine in which content database the requested content is stored, and accordingly accesses and assembles the accessed content. Thus links (e.g., links 52, 58,72,82 (FIGS. 3A & 3B) are simplified and content can be updated by coupling new databases to access controller 102 without changing the corresponding link in the stored content in memory 13.

The embodiments described herein are illustrative and not limiting. For example, in some instances locally and remotely stored content includes data (e.g., alphanumeric data, data for speech synthesis) in addition to, or in lieu of, audio or video information. In addition, remotely stored content need not be stored as a database, but need only be stored so that the content can be accessed as described herein. Required programming and communications formatting is routine in light of this disclosure and many acceptable variations are possible. Therefore the scope of the invention is limited only by the following claims.

We claim:

1. A method of outputting content to a user, comprising the acts of:

using a first receiver to receive first information from a wireless signal, wherein the first receiver is a mobile device configured to receive and store information content for subsequent output to a first user upon demand by the first user, wherein the first information comprises first information content stored in one or more databases remote from the first receiver, and wherein the first information comprises a link associated with the first information content and pointing to second information content stored in the one or more databases;

storing the first information in a memory of the receiver;

outputting from the memory to the first user the first information content, and during the outputting of the first information content displaying to the first user an indication that the link is stored in the memory;

receiving at the first receiver a command by the first user to access the remotely stored second information content and deliver the remotely stored second information content from the one or more databases to a second receiver, wherein the second receiver is a device configured to receive and store information content for subsequent output to the first user or to a second user upon demand by the first or the second user, respectively; and using the link stored in the memory to access and deliver the remotely stored second information content to the second receiver.

2. The method of claim 1 wherein the remotely stored second information content comprises video content.

3. The method of claim 1 wherein the remotely stored second information content comprises audio content.

4. The method of claim 1 wherein the second receiver is a personal computer.

5. The method of claim 1 wherein the remotely stored second information content is associated with a purchase request for a good or service.

6. The method of claim 1 wherein displaying an indication comprises outputting a visual indication.

7. The method of claim 1 wherein displaying an indication comprises outputting an audio indication.

8. The method of claim 1 wherein the command to access is a manually input command.

9. The method of claim 1 wherein the command to access is a verbal command.

10. The method of claim 1 wherein using the link to access the remotely stored second information content comprises using a two-way wireless communications link.

11. The method of claim 1 wherein delivering the remotely stored second information content comprises capturing the remotely stored second information content from a wireless broadcast signal.

12. The method of claim 1 wherein delivering the remotely stored second information content comprises using a wireline communications link.

13. A method of providing content to a user, comprising the acts of:

broadcasting first information to a first receiver, wherein the first information comprises first information content stored in one or more databases remote from the first receiver, wherein the first information comprises a link associated with the first information content and pointing to second information content stored in the one or more databases, wherein the first receiver is a mobile device configured to receive and store information content for subsequent output to a first user upon demand by the first user, wherein during output of the first information content to the first user the first receiver displays to the first user an indication that the link is stored in the first receiver, and wherein the receiver is configured to receive a command by the first user to access the remotely stored second information content and deliver the remotely stored second information content from the one or more databases to a second receiver;

receiving from the first receiver a request by the first user to access the stored second information content and to deliver the accessed second information content to the second receiver, wherein the second receiver is a device configured to receive and store information content for subsequent output to the first user or to a second user upon demand by the first or the second user, respectively; and delivering, in response to the request, the second information content to the second receiver.

14. The method of claim 13 wherein the remotely stored second information content comprises video content.

15. The method of claim 13 wherein the remotely stored second information content comprises audio content.

16. The method of claim 13 wherein the second receiver is a personal computer.

17. The method of claim 13 wherein the second information content is associated with a purchase request for a good or service.

18. The method of claim 13 wherein displaying an indication comprises outputting a visual indication.

19. The method of claim 13 wherein displaying an indication comprises outputting an audio indication.

20. The method of claim 13 wherein the command to access is a manually input command.

21. The method of claim 13 wherein the command to access is a verbal command.

22. The method of claim 13 wherein delivering the second information content comprises capturing the second information content from a wireless broadcast signal.

23. The method of claim 13 wherein delivering the second information content comprises using a wireline communications link.

24. The method of claim 13 wherein the first information content further comprises a second link associated with the first information content and pointing to third information content stored in the one or more databases, wherein the second information content is associated with a first demographic category, and wherein the third information content is associated with a second demographic category.

25. The method of claim 24, wherein the second information content comprises advertising targeted at the first demographic category, and wherein the third information content comprises advertising targeted at the second demographic category.

26. The method of claim 13, wherein the second information content comprises advertising.

* * * * *